United States Patent [19]

Halasa

[11] 4,258,160
[45] Mar. 24, 1981

[54] PROCESS FOR POLYMERIZING BUTADIENE

[75] Inventor: Adel F. Halasa, Bath, Ohio

[73] Assignee: The Firestone Tire & Rubber Company, Akron, Ohio

[21] Appl. No.: 27,553

[22] Filed: Apr. 6, 1979

Related U.S. Application Data

[63] Continuation-in-part of Ser. No. 863,492, Dec. 22, 1977, abandoned, which is a continuation of Ser. No. 721,025, Sep. 7, 1976, abandoned, which is a continuation-in-part of Ser. No. 574,788, May 5, 1975, abandoned, which is a continuation-in-part of Ser. No. 491,723, Jul. 25, 1974, abandoned.

[51] Int. Cl.$^3$ .................. C08F 4/60; C08F 136/06
[52] U.S. Cl. ............................ 526/138; 526/335; 252/429 B
[58] Field of Search ........................................ 526/138

[56] References Cited

U.S. PATENT DOCUMENTS

| 3,066,127 | 11/1962 | Carlson et al. | 526/138 |
| 3,068,217 | 12/1962 | Higgins et al. | 526/340.4 |
| 3,135,725 | 6/1964 | Carlson et al. | 526/169.1 |
| 3,300,466 | 1/1967 | Marullo et al. | 526/153 |
| 3,317,494 | 5/1967 | Farson | 526/136 |
| 3,317,502 | 5/1967 | Harban et al. | 526/138 |
| 3,502,637 | 3/1970 | Marullo et al. | 526/169.1 |
| 3,522,332 | 7/1970 | Schikawa et al. | 526/139 |
| 3,635,930 | 1/1972 | Fodor | 526/136 |
| 3,778,424 | 12/1973 | Sugiura et al. | 526/136 |
| 3,813,374 | 5/1974 | Perry | 526/138 |

FOREIGN PATENT DOCUMENTS 38-26786 12/1963 Japan ........................................ 526/136

Primary Examiner—Edward J. Smith

[57] ABSTRACT

1,3-Butadiene is polymerized in the liquid phase in the presence of a catalyst composition comprising:
(a) a cobalt-containing component;
(b) $R_2AlX$ wherein R is a hydrocarbon radical of 1–8 atoms, and X is halogen or hydrogen, and
(c) COS.

The cobalt-containing component may be a cobalt salt, such as a cobalt halide, carboxylate, thiocarboxylate, carbonate, thiocarbonate, etc. or a complex of such a salt with an oxygen-containing or nitrogen-containing group either in the same compound or in a separate compound. Typical aluminum compounds that may be used are dibutyl aluminum chloride, dipropyl aluminum chloride, diethyl aluminum chloride, bibutyl aluminum hydride, diamyl aluminum hydride, dipropyl aluminum hydride, etc. When the temperature for polymerization is maintained at −30° to 30° C., the resultant polymers have at least 40% syndiotactic-1,2 and with higher temperatures the syndiotactic-1,2 proportion increases until at 70° C. or higher, the polymer is substantially all syndiotactic-1,2. The yields run from about 40% to almost quantitative at optimum conditions.

23 Claims, No Drawings

PROCESS FOR POLYMERIZING BUTADIENE

This application is a continuation-in-part of application Ser. No. 863,492 filed Dec. 22, 1977 now abandoned, which is a continuation of application Ser. No. 721,025 filed Sept. 7, 1976, now abandoned, which in turn is a continuation-in-part of application Ser. No. 574,788 filed May 5, 1975, now abandoned, which in turn is a continuation-in-part of application Ser. No. 491,723 filed July 25, 1974, now abandoned.

BACKGROUND OF THE INVENTION

1. Field of the Invention

This invention relates to a process for the preparation in high yield of a polybutadiene having a substantial proportion of syndiotactic-1,2 microstructure. More specifically this process involves the polymerization of 1,3-butadiene in the presence of a novel catalyst composition.

2. Related Prior Art

U.S. Pat. No. 3,778,424 discloses the preparation of 1,2-polybutadiene which is syndiotactic in character and uses for the polymerization of 1,3-butadiene a catalyst composition comprising: (a) a soluble cobalt compound; (b) an $AlR_3$ compound in which R is a hydrocarbon radical of 1-6 carbon atoms and (c) $CS_2$. The soluble cobalt compound is defined as including, among various other compounds, (1) a cobalt salt of an organic carboxylic acid of at least 6 carbon atoms, such as cobalt octoate and cobalt naphthenate and (2) a complex of a cobalt halide, such as $CoCl_2$, with "a tertiary amine, e.g., pyridine, triethylamine, tributylamine and dimethylaniline . . . , and an N,N-dialkylamide, e.g., N,N-dimethyl formamide, N,N-dimethyl acetamide and N,N-diethyl formamide." The only such complex exemplified in the patent is the $CoCl_2$ complex with pyridine.

In the above patent it is indicated that the prior art method of preparing syndiotactic 1,2-polybutadiene is unsatisfactory because of low yields as well as unsatisfactory physical properties. However, the best yield shown in the patent is in Table 5 where the control experiment shows a yield of 56%.

Marullo et al, U.S. Pat. No. 3,502,637 teaches the use of a catalyst system comprising a dialkyl aluminum halide and a solution of a cobalt compound which is a soluble complex of a normally insoluble salt of cobalt to polymerize conjugated dienes. As stated in Col. 7, lines 15-19, "The polymers of the conjugated diolefins obtained by the present method have substantially 1,4-enchainment of the monomer units and contain only a low proportion of vinyl groups. In general, the cis-structure prevails, as observed in the case of butadiene."

Marullo et al in U.S. Pat. No. 3,182,051 (Col. 1, lines 55-59) and in U.S. Pat. No. 3,300,466 (Col. 1, lines 45-58) make the statement "Thus by polymerizing butadiene in the presence of a catalyst containing a group 8 metal compound, such as a cobalt compound, and an alkyl aluminum halide, in any ratio of aluminum to group 8 metal, polymers having a substantially cis-1,4 structure are obtained." Both of these patents teach, however, that a combination of an aluminum trialkyl and a dialkyl aluminum halide may be used in which the combination contains 10-53% by weight of the dialkyl aluminum halide to polymerize butadiene to a syndiotactic-1,2 polymer. Nevertheless the teaching is that the alkyl aluminum halide per se, that is in the absence of a trialkyl aluminum compound, in combination with a cobalt compound, produces cis-1,4 polybutadiene.

Carlson et al in U.S. Pat. No. 3,066,127 shows the use of anhydrous cobalt compounds in combination with trialkyl aluminum, alkyl aluminum halides or alkyl aluminum hydrides produce polybutadiene of substantially all cis-1,4 structure. With controlled increased amounts of water, the cis-1,4 content decreases to 92% and with larger amounts of water the catalyst becomes inactive.

Carlson et al U.S. Pat. No. 3,135,725 likewise teaches the use of anhydrous cobalt compounds with trialkyl aluminum or alkyl aluminum halide compounds to give polybutadiene of substantially all 1,4 structure. With anhydrous materials, the polymer product has "little or no trace of trans-1,4 or 1,2 structures." "In most cases quite small variations in water content will also cause variation in the cis-1,4 and trans-1,4 content of the polymers." Consequently neither of these Carlson et al patents teach that there is anything other than a 1-4 structure produced in the polybutadiene when either trialkyl aluminum or an alkyl aluminum halide or an alkyl aluminum hydride is used in combination with a cobalt compound in a polymerization system.

In none of the above Marullo et al or Carlson et al patents is there any mention of COS nor of $CS_2$. In each of these patents the polymer products is substantially all of 1,4 microstructure when an alkyl aluminum halide is used as the sole aluminum reducing component.

In the parent applications from which this present application is derived, the examiner has also cited the following: Harban U.S. Pat. No. 3,317,502; Fodor U.S. Pat. No. 3,635,930; Farson U.S. Pat. No. 3,317,494; Perry 3,813,374 and Sumitomo Japanese Pat. No. 3826,786. The Harban et al patent discloses the use of $TiCl_4+AlR_3$ or alkyl aluminum halide with COS to polymerize olefins and Fodor discloses the use of $TiCl_3.AlCl_3.AlR_3$ or alkyl Al halide with $CS_2$ to polymerize olefins. Neither Harban et al nor Fodor mention butadiene or other dienes and therefore do not disclose the type of polymers that might be produced.

Farson and Perry both use $TiCl_4$ plus $AlR_3$ or alkyl Al halides to polymerize butadiene. Farson also uses $CS_2$ and Perry also uses COS. Both processes produce cis-1,4 polymer.

The Japanese patent (Sumitomo) describes the use of $TiCl_4$ with $AlH_2X$ plus $CS_2$ for the polymerization of olefins. No mention is made of butadiene and therefore no indication of the microstructure.

Consequently none of these additional references teach anything that would lead anyone to believe that anything other than a polymer of predominantly cis-1,4 structure would be obtained by the polymerization of butadiene with a catalyst system comprising a cobalt compound and a dialkyl aluminum halide as the sole reducing agent with or without COS.

Moreover, Halasa U.S. Pat. No. 3,993,856 shows that with the Co component and an alkyl aluminum dihalide, the use of $CS_2$ gives cis-1,4-polybutadiene.

SUMMARY OF THE INVENTION

In accordance with the present invention it has been found that the yields may be improved up to substantially quantitative, and polybutadiene of substantial 1,2 content and syndiotactic character may be prepared by polymerizing 1,3-butadiene in liquid phase in the presence of a catalyst composition comprising:

(a) a cobalt-containing component which may be a cobalt salt or a complex of a cobalt salt with an oxygen-containing or nitrogen-containing group, either in the same compound or in a separate compound;

(b) a reducing agent comprising $R_2AlX$, wherein R represents a hydrocarbon radical of 1-8 carbon atoms and X is halogen or hydrogen, and (c) COS.

In this catalyst composition, the proportion of Co to monomer is in the range of 0.01-1.0, preferably 0.02-0.1 millimoles of Co compound per 100 gms of monomer, the ratio of Al/Co is 10-500, preferably 25-75 moles of Al compound per mole of Co compound, the ratio of COS/Co is 1-10, preferably 2-6 moles of COS per mole of Co.

Contrary to the above-mentioned U.S. Pat. No. 3,778,425, the cobalt compound does not need to be soluble in the reaction medium and may merely be suspended in the medium. Therefore the limitations placed on the cobalt compounds to insure solubility do not apply in the present invention, except that in some cases the insolubility of a cobalt component may result in a lower syndiotactic-1,2 content. Actually the majority of Co compounds used in the practice of this invention are insoluble in both aromatic and aliphatic hydrocarbons. Nonetheless, polymerization may be conducted by solution or suspensions of the cobalt component in aromatic hydrocarbons, such as benzene, toluene, xylene, etc., and also in aliphatic hydrocarbons, such as hexane, heptane, by solution or suspension of the cobalt component in aromatic hydrocarbons, such as benzene, toluene, xylene, etc., and also in aliphatic hydrocarbons, such as hexane, heptane, octane, decane, cyclohexane, cycloheptane, etc. If desired, the polymerization may be conducted in liquid butadiene.

Typical of the cobalt salts that may be used in the catalyst system of this invention are both cobaltous and cobaltic salts such as the halides, carboxylates, thiocarboxylates, carbonates, etc., e.g., $CoCl_2$, $CoCl_3$, $CoBr_2$, $CoBr_3$, $CoI_2$, $CoI_3$, $CoF_2$, $CoF_3$, Co diacetate, $CoCo_3$, Co diformate, Co dipropionate, Co dihexoate, Co dioctoate, Co dinaphthenate, Co bis (dithioacetate), Co bis (dithiocarbamate), Co bis (mercatobenzothiazole), Co thiocarbonate, etc.

Also useful are salts of carboxylic and thiocarboxylic acids which also contain keto or thioketo or nitrogen groups therein with which the cobalt may be complexed in addition to being attached as a salt component. These are referred to herein as salt-complexes. Typical nitrogen groups that may be present for such complexing purposes are: primary, secondary or tertiary amino groups, i.e., $-NH_2$, $-NH-$, or $N-$, respectively; the aldimino group, $-CH=NR'$; the ketimino group, $C=NR'$, the nitro group $-NO_2$; and the nitroso group, $-N=O$, etc., wherein $R'$ is hydrogen or a hydrocarbon group as defined above for R. Furthermore, also contrary to the above U.S. Pat. No. 3,778,424, a complexing nitrogen does not need to be in the form of a tertiary amine, but may be also in the form of secondary and primary amines as well as in the form of other nitrogen groups as listed above, provided they meet the other limitations or requirements of this invention.

Preferred among the salt-complex formers are the amino-acids, such as:

picolinic acid, $C_5H_{10}N(COOH)$;
glycine, $NH_2CH_2COOH$;
alanine, $CH_3CH(NH_2)COOH$,
aminobutyric acid, $CH_3CH_2CH(NH_2)COOH$;
threonine, $CH_3CH(OH)CH(NH_2)COOH$;
norvaline, $CH_3CH_2CH_2(NH_2)COOH$;
valine, $(CH_3)_2CHCH(NH_2)COOH$;
methionine, $CH_2SCH_2CH_2CH(NH_2)COOH$;
leucine, $(CH_2)_2CHCH_2CH(NH_2)COOH$;
aspartic acid,

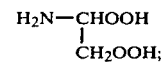

n,n-dimethyldithiocarbamic acid, $(CH_2)_2NCSSH$;
N-acetylanthranilic acid, $o-CH_3CONHC_6H_4COOH$;
mercaptobenzothiazole,

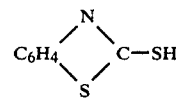

hippuric acid, $C_6H_5CONHCH_2COOH$;
glutamic acid,

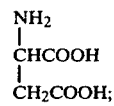

lysine, $NH_2(CH_2)_4CH(NH_2)COOH$;
1,2-diaminopropionic acid, $NH_2CH_2CH(NH_2)COOH$;
aminopimelic acid, $HOOC(CH_2)_4CH(NH_2)COOH$;
betaaminovaleric acid, $CH_2CH_2CH(NH_2)CH_2COOH$;
2,6-diamino-4-hydroxy-caproic acid, $NH_2CH_2CH(OH)CHCH_2CH(NH_2)COOH$;
hydroxyethyl glycine, $HOCH_2CH_2NHCH_2COOH$;
aminoethyl glycine, $NH_2CH_2CH_2NHCH_2COOH$;
iminodiacetic acid, $HN(CH_2COOH)$;
iminodipropionic acid, $HN(CH_2CH_2COOH)_2$
aminoethyliminoacetic acid, $H_2NCH_2CH_2N(CH_2COOH)_2$,
hydroxyethyliminediacetic acid, $HOCH_2CH_2N(CH_2COOH)_2$,
hydroxypropyliminodiacetic acid, $HO(CH_2)_3N(CH_2COOH)_2$;

as well as 3-aminotyrosine, canavanine, 3-4-hydroxylpnehylalamine, ethonine, ethonine sulfone, citrulline, creatine, cysteic acid, cystine, dibromothyromine, glycocyanine, histidine, homocystine, hydroxyproline, methylhistidine, pennicillamine, pyroglutamic acid, thienylalanine, carboxymethyl aspartic acid, etc.

Amino acids preferred in the practice of this invention are the aliphatic amino acids having no more than about 20 carbon atoms therein, and preferably having an amine group separated from a carboxylic group by no more than 2 carbon atoms. The amino acids and their derivatives can have a plurality of amino and carboxylic groups therein and also can contain other functional groups therein which do not interfere with and, in some cases, even may enhance the complexing or chelating tendencies of the compound.

Generally the salt is formed which has two acid groups attached to one cobalt atom and the cobalt is furthermore complexed or chelated with the nitrogen.

It is also advantageous, particularly where it is desired to have the cobalt component in solution, to use complexing agents in which the keto, thioketo or nitrogen-containing group is in a separate compound. Suitable compounds for this purpose include beta-diketones of the formula:

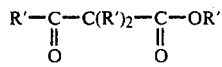

wherein R' is as defined above. Typical examples of these are acetylacetone and ethyl acetoacetate which form complexes with cobalt salts.

Nitrogen-containing compounds are those which contain the various nitrogen-containing groups listed above for the salt-complex formers. In addition to the various compounds listed above, other complex formers are tertiary phosphines, such as triphenyl phosphine, tributyl phosphine, etc., N-N-diethylformamide, etc., alcohols such as methanol, ethanol, propanol, ethylene glycol, etc. Particularly preferred complexing agent for this purpose are compounds containing nitrogen and oxygen or sulfur, preferably with no more than 2 carbon atoms separating the nitrogen from the oxygen or sulfur. Typical of these are: N-methylpyrrolidone, caprolactam, pyrrolidone, o,m or p-aminoacetophenone, o,m or p-aminoacetophenone, N-methyl-aminobenzophenone, 2-aminocycloheanone, 4-aminocyclohexanone, N-methyl-2-aminocyclohexanone, N,N-dimethylcyclohexanone, etc., and the corresponding thioketo compounds, such as N-Me-thiopyrrolidone, thiocaprolactam, amino-thioacetophenone, etc.

Reducing agents that may be used in the practice of this invention include mono and dihydrocarbyl aluminum halides and hydrides, and aluminum trihydride. Alkyl groups of 1-8 carbon atoms are advantageous in the above compounds but even larger groups or aromatic or cycloaliphatic groups such as phenyl, tolyl, xylyl, naphyhyl, cyclohexyl, cycloheptyl, etc., may also be present in place of the alkyl groups in the respective compounds. Hydrocarbyl groups of at least 3 carbom atoms are advantageous, preferably at least 4 carbon atoms, since aluminum compounds having less than three carbon atoms require much lower temperatures than required with higher R groups to give practical yields of polymer produced.

Typical dihydrocarbyl aluminum compounds that may be used include: dimethyl aluminum chloride, diethyl aluminum chloride, dipropyl aluminum chloride, dibutyl aluminum chloride, diamyl aluminum bromide, dihexyl aluminum iodide, dioctyl aluminum fluoride, diphenyl aluminum chloride, dicyclohexyl aluminum chloride, diisobutyl aluminum hydride, diisoamyl aluminum hydride, etc.

When a separate compound, either cyclic or linear, is used to form a cobalt complex, such complex former may be used in a proportion of 1-30 moles per mole of cobalt compound, preferably 1-16 moles when a pyrrolidone is used and 1-6 moles when a lactam is used. In the carboxylates and thiocarboxylates used herein, it is generally not necessary to have more than 20 carbon atoms in such compounds.

The catalyst combination is preferably prepared in the solution of butadiene and solvent or suspension medium. The order of addition of components is not critical, except that the COS should be added last. With appropriate proportions of catalyst components, the yield is generally quantitative, with the 1,2 content being at least 80% and generally over 90% and very high in syndiotactic character with melting points in the range of 190°-225° C.

With polymerization temperatures of −30° to 30° C. the yield is approximately 100%. However the polymer product is roughly 50% syndiotactic-1,2 and 50% 1,4. As the temperature is increased up to 80° C. or higher the percent syndiotactic increases but the yield or percent conversion decreases. At 70°-80° C. the polymer product is substantially all syndiotactic-1,2 but the yield has decreased to 30-40%. Therefore a polymerization temperature is selected which gives a suitable syndiotactic content and an acceptable yield.

No other particular conditions are required for the polymerization of this invention except that an inert atmosphere, such as nitrogen and an inert solvent medium should be used. The pressure may be atmospheric or superatmospheric. The polymerization can be performed either batch-wise or continuously, using known apparatus. The polymer can be easily isolated by inactivating and eliminating the catalyst by treatment with alcohols, etc.

The polymers obtained from the process of this invention are useful for the production of films, fibers and other shaped articles. Such products have high melting point, high crystallinity, excellent solvent resistance, and good mechanical properties such as impact stength, etc. Moreover, because of the pendent vinyl groups, products made from these polymers have good printability, adhesion and platability, and such polymers are particularly suitable for crosslinking and grafting post-treatments.

In most cases, in the practice of this invention, the polymer is substantially all of syndiotactic-1,2 structure. However, in some cases where the cobalt component is of an insoluble type, the polymer may have 40-60% syndiotactic-1,2 structure and 40-60% cis-1,4 structure in the same polymer molecule. Such polymers having this mixed structure generally have two melting points, one generally being −8° to 126° C. for the cis-1,4 portion and another of about 200° C. for the syndiotactic portion.

These polymers of mixed structures are more rubbery than those of substantially all syndiotactic-1,2 structure. Moreover, they are more easily processed, are more easily hydrogenated and more easily thermoset than those more completely of the syndiotactic-1,2 structure.

SPECIFIC EMBODIMENTS OF THE INVENTION

The invention is illustrated by the following examples which are intended merely for purpose of illustration and are not to be regarded as limiting the scope of the invention or the manner in which it may be practiced. Unless specifically indicated otherwise, parts and percentages are given by weight.

EXAMPLE I

A polymerization is conducted using a 28 oz. bottle previously dried and flushed out with dry nitrogen. To this bottle there is added 392.5 grs. of a toluene solution containing 40 grs. 1,3-butadiene (10.2%). To this solution maintained at 80° C., is then added 0.30 millimoles of a $CoCl_2$ complex in toluene comprising 16 moles of N-Methyl-pyrrolidone per mole of $CoCl_2$. The cobalt chloride complex is soluble in the reaction medium and gives a blue color. This composition is reduced by adding 30 millimoles of diisobutyl aluminum chloride. Then 3.0 millimoles of COS is added. This mixture is agitated for 6 hours at 80° C. The Al/Co ratio is 100/1 and the COS/Co ratio is 10/1. A crystalline insoluble polymer is obtained which is isolated and dried. Conversion is 30% and the product has a melting point of 209° C. Infrared analysis shows 97% 1,2 structure which is over 95% syndiotactic.

EXAMPLE II

The procedure of Example I is repeated at a temperature of 70° C. using 0.5 millimoles of the $CoCl_2$ complex, 50 millimoles of diisobutyl aluminum chloride and 5.0 millimoles of COS. The Al/Co molar ratio is 100/1 and the COS/Co ratio is 10/1. A yield of 50% polymer is obtained, the IR analysis shows 90% syndiotactic-1,2 structure and the melting point of the polymer is 205° C.

EXAMPLE III

The procedure of Example I is repeated except that a polymerization temperature of 50° C. is used. With this temperature the conversion is 60%. However, the IR analysis shows 97% 1,2 structure and the 218° C. melting point shows high syndiotactic structure.

EXAMPLE IV

The procedure of Example III is repeated using a temperature of 40° C. The conversion is 90% and the product is a mixture of 90% syndiotactic-1,2 and 10% cis-1,4.

EXAMPLE V

The procedure of Example II is repeated twice using the polymerization temperature of 70° C. and the proportions of catalyst components indicated in the table below:

| Millimoles | | |
|---|---|---|
| $CoCl_2 \cdot 16NMP$ | 0.15 | 0.15 |
| Millimoles | | |
| $(iso-C_4H_9)_2AlCl$ | 15.0 | — |
| Millimoles | | |
| $(iso-C_4H_9)_2AlH$ | — | 5.0 |
| Millimoles | | |
| COS | 5.0 | 5.0 |
| % Conversion | 40.5% | 52.6% |
| Melting Point | 206° C. | 208° C. |
| 1,2 Content | 94% | 96% |

Analysis showed that both products are syndiotactic.

EXAMPLE VI

The procedure of Example I is repeated with a equivalent amount of cobalt dipicolinate as the cobalt component. The resulting polymer has about 50% syndiotactic-1,2 and 50% 1,4 in the polymer molecules of which 70–80% is cis-1,4 and 30–20% trans.

EXAMPLE VII

The procedure of Example I is repeated a number of times with satisfactory results using as the $CoCl_2$ complex equivalent amounts respectively of:

(a) $CoCl_2 \cdot 6$ caprolactam
(b) $CoCl_2 \cdot 16$ pyrrolidone
(c) $CoCl_2 \cdot 10$ p-aminoacetophenone
(d) $CoCl_2 \cdot 10$ N-methyl-thiopyrrolidone
(e) $CoCl_2 \cdot 6$ thiocaprolactam
(f) $CoCl_2 \cdot 2$ acetylacetone
(g) $CoCl_2 \cdot 2$ acetoacetate

EXAMPLE VIII

The procedure of Example VI is repeated a number of times with satisfactory results using as the cobalt component 0.9 millimoles of the following together with Al/Co ratios of 100/1 and COS/Co ratios of 10/1:

(a) Co dihippurate
(b) Co bis(N-acetyl-anthranilate)
(c) Co bis(N,N-dimethyldithiocarbamate)
(d) Co diglycinate
(e) Co dialaninate
(f) Anhydrous cobaltous chloride
(g) Cobaltous carbonate
(h) Cobaltous diacetate
(i) Cobaltous bis(dithioacetate)
(j) Cobaltous dioctoate
(k) Cobaltous dinaphthoate

EXAMPLE IX

The procedure of Example I is repeated a number of times with satisfactory results using in place of the diisobutyl aluminum chloride equivalent amounts respectively of:

(a) Diisoamyl aluminum chloride
(b) Diisobutyl aluminum bromide
(c) Diisopropyl aluminum iodide
(d) Dihexyl aluminum chloride
(e) Dihexyl aluminum fluoride
(f) Phenyl isobutyl aluminum chloride
(g) Cyclohexyl amyl aluminum chloride
(h) Diisoamyl aluminum fluoride
(i) Diisobutyl aluminum hydride
(j) Diisoamyl aluminum hydride
(k) Diphenyl aluminum hydride

EXAMPLE X

The procedure of Example I is repeated a number of times with similar results using in place of the $CoCl_2$ equivalent amounts respectively of:

(a) $CoCl_3$
(b) $Co(COOCH_3)_2$
(c) $CO(OOCC_6H_5)_2$
(d) $CoBr_2$
(e) $CoCO_3$
(f) $Co(SSCCH_3)_2$

As previously indicated, it is important that the carbon oxysulfide is added as the last of the catalyst components. Even when modifiers or molecular weight control agents such as nitriles, i.e., acetonitrile, etc., are added, it is desirable that the COS is added after such molecular weight control agents.

With the very high melting points generally obtained in the polybutadienes produced by the process of this invention, for example from about 200° to 225° C., these polymers may be difficult to process and to apply for particular purposes. In such cases the molecular weight may be controlled and the processability improved by the presence of organonitriles during the polymerization.

With the addition of an organonitrile compound in the aforesaid catalyst composition, the melting point of the syndiotactic 1,2-polybutadiene product can be freely controlled to the desired value, within the wide range of from approximately 100° C. to 210° C., in accordance with the added quantity of the nitrile compound. Organonitrile compounds which are useful for this purpose may be represented by the formula, R(CN)$_n$, R being an alkyl of 1 to 10 carbons, and aralkyl of 7 to 10 carbons, or an aryl of 6 to 12 carbons and n being 1 or 2. Specific examples include acetonitrile, propionitrile, adiponitrile, sebaconitrile, benzalnitrile, benzylnitrile, etc.

The amount of nitrile compound used in the catalyst is variable, in accordance with the desired properties (particularly melting point) of the product polybutadiene. Generally speaking however, it is convenient to use the nitrile compound in a proportion of 0.5 to 100 millimoles per 100 grams of butadiene.

The effect of these organonitrile compounds in reducing the melting point of the polymer is illustrated in the following examples:

EXAMPLE XI

The procedure of Example I is repeated a number of times using individually varying amounts of acetonitrile in the polymerization mixture with the COS being added as the last catalyst component. The amounts of nitrile and the results effected on the melting points of the polymers are tabulated as follows:

| Millimoles of Acetonitrile | Melting Point °C. |
| --- | --- |
| 0 | 209 |
| 2.5 | 194 |
| 5 | 183 |
| 7.5 | 170 |
| 25 | 145 |
| 50 | 112 |

EXAMPLE XII

The procedure of Example XI is repeated four times using individually, in place of the acetonitrile, 5 millimoles of benzylnitrile, sebaconitrile, bensonitrile and adiponitrile, respectively. The following reductions in melting point are obtained:

| Nitrile | M.P. °C |
| --- | --- |
| Benzylnitrile | 181° |
| Sebaconitrile | 166° |
| Benzonitrile | 175° |
| Adiponitrile | 180° |

The molecular weight of the polymers may be similarly controlled with various carboxylic acids, anhydrides, ketones, aldehydes and phenols. These are used in equivalent amounts and under the conditions shown above for the nitriles.

While certain features of this invention have been described in detail with respect to various embodiments thereof, it will of course be apparent that other modifications can be made within the spirit and scope of this invention, and it is not intended to limit the invention to the exact details shown above except insofar as they are defined in the following claims.

The invention claimed is:

1. A process for the preparation of polybutadiene high in syndiotactic-1,2 structure which comprises polymerizing 1,3-butadiene in the liquid phase in the presence of a catalyst composition consisting essentially of:
   (a) a cobalt-containing component selected from the class consisting of cobalt halides, carboxylates, thiocarboxylates, carbonate, thiocarbonate and complexes of said halides, carboxylates, thiocarboxylates, carbonate and thiocarbonate, said complex being formed between the cobalt and a nitrogen, keto or thioketo group in the same compound or with a separate cyclic compound having both a nitrogen and keto or thioketo group therein, said component being used in a proportion of 0.01–1 millimoles per 100 grams of butadiene;
   (b) a reducing agent having the formula AlR$_2$X wherein R is a hydrocarbon radical of 1–8 carbon atoms, and X is halogen or hydrogen, said agent being used in a proportion of 10–500 moles per mole of cobalt-containing component; and
   (c) COS in a proportion of 1–10 moles per mole of cobalt-containing component.

2. The process of claim 1 in which said cobalt-containing component is a cobalt compound complex of a cyclic compound having an amino nitrogen and a keto or thioketo group therein.

3. The process of claim 2 in which said complex is one of cobaltous chloride and N-Methyl-pyrrolidone.

4. The process of claim 2 in which said complex is one of cobaltous chloride and caprolactam.

5. The process of claim 2 in which said reducing agent is a dialkyl aluminum chloride.

6. The process of claim 2 in which said reducing agent is a dialkyl aluminum hydride.

7. The process of claim 5 in which said reducing agent is diisobutyl aluminum chloride.

8. The process of claim 5 in which said complex former is N-methylpyrrolidone and is used in a proportion of 1–16 moles per mole of Co salt.

9. The process of claim 8 in which said cobalt compound is cobaltous chloride.

10. The process of claim 2 in which said complex former is caprolactam and is used in a proportion of 1–6 moles per mole of Co salt.

11. The process of claim 10 in which said cobalt compound is cobaltous chloride.

12. The process of claim 2 in which 1–16 moles of cyclic compound is used per mole of Co compound; said cobalt compound is used in a proportion of 0.02–0.1 millimoles per 100 grams of butadiene; the proportion of reducing agent is 25–75 moles of Al compound per mole of Co compound; and the proportion of COS is 2–6 moles per mole of Co compound.

13. The process of claim 2 in which said reducing agent is a dialkyl aluminum chloride, said cyclic compound is N-methyl-pyrrolidone used in a proportion of 1–16 moles per mole of Co compound, and said cobalt compound is cobaltous chloride.

14. The process of claim 2 in which said reducing agent is a dialkyl aluminum chloride, said cyclic compound is caprolactam used in a proportion of 1–6 moles of caprolactam per mole of Co compound, and said cobalt compound is cobaltous chloride.

15. The process of claim 1 in which said cobalt component is Co dipicolinate.

16. The process of claim 1 in which said cobalt component is Co dihippurate.

17. The process of claim 1 in which said cobalt component is Co bis(N-acetylanthranilate).

18. The process of claim 1 in which said cobalt component is Co bis(N,N-diemthyldithiocarbamate).

19. The process of claim 1 in which said cobalt component is Co bis(benzothiazolin-2-thiolate).

20. The process of claim 1 in which the R group in said reducing agent has at least three carbon atoms.

21. The process of claim 1 in which the R group in said reducing agent has at least four carbon atoms.

22. The process of claim 2 in which the R group in said reducing agent has at least four carbon atoms.

23. The process of claim 3 in which the R group in said reducing agent has at least four carbon atoms.

* * * * *

UNITED STATES PATENT AND TRADEMARK OFFICE
CERTIFICATE OF CORRECTION

PATENT NO. : 4,258,160
DATED : March 24, 1981
INVENTOR(S) : Adel F. Halasa

It is certified that error appears in the above-identified patent and that said Letters Patent are hereby corrected as shown below:

Col. 4, line 3

"methionine, $CH_2$" should read -- methionine, $CH_3$ --

Col. 5, line 26

"2-aminocycloheanone" should read
-- 2-aminocyclohexanone --

Col. 5, line 39

"carbom" should read -- carbon --

Signed and Sealed this

Twenty-first Day of July 1981

[SEAL]

Attest:

GERALD J. MOSSINGHOFF

Attesting Officer

Commissioner of Patents and Trademarks